Patented Feb. 22, 1949

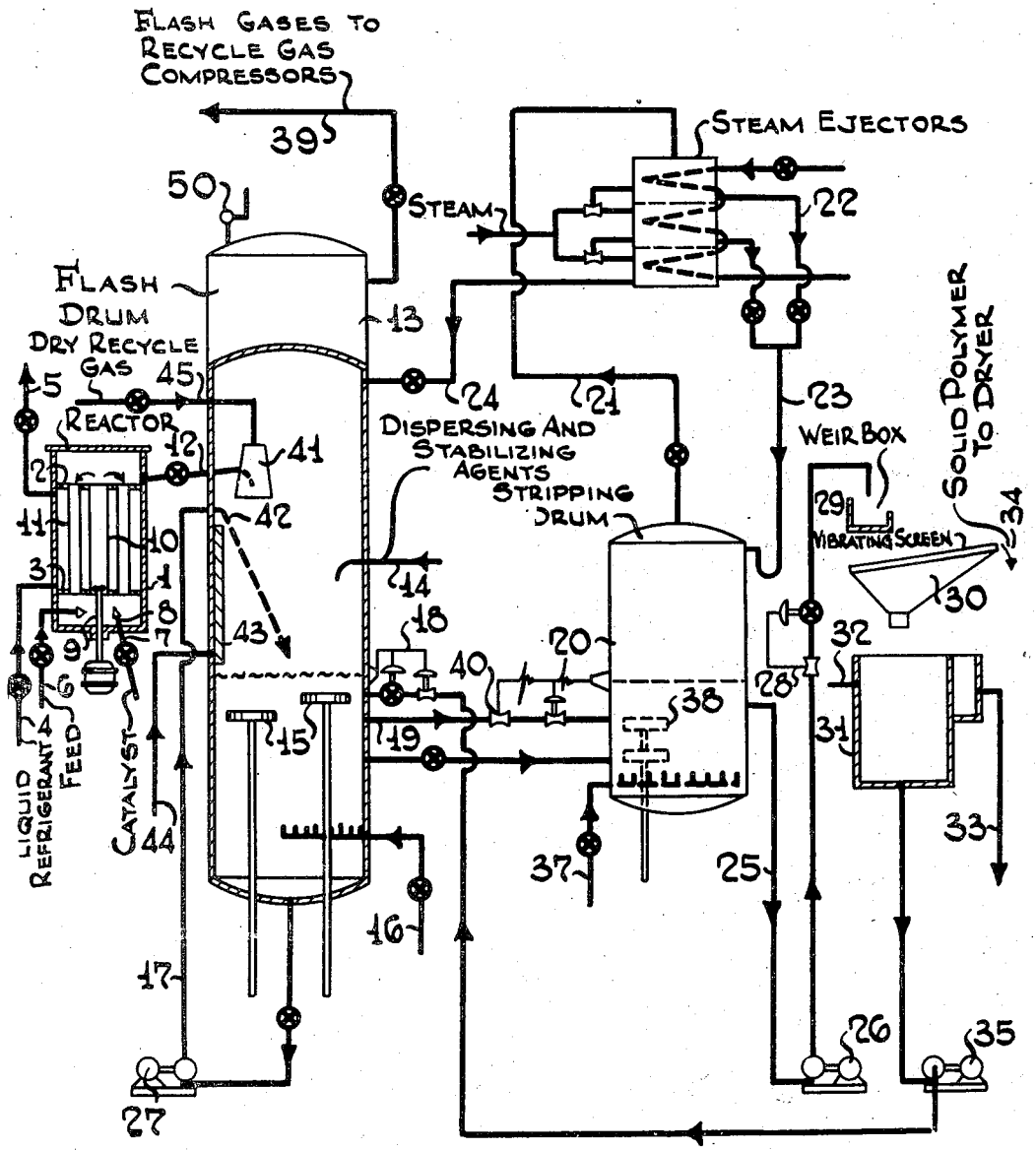

2,462,123

UNITED STATES PATENT OFFICE 2,462,123

PROCESS FOR INCORPORATING ANTIOXIDANTS INTO SYNTHETIC RUBBERY ISOBUTYLENE POLYMERS

Joseph F. Nelson, Elizabeth, N. J., assignor to Standard Oil Development Company, a corporation of Delaware Application August 14, 1945, Serial No. 610,839

12 Claims. (Cl. 260—93)

This invention relates to the preparation of hydrocarbon polymers, and relates more particularly to a method for improving the handling and processing characteristics of rubbery polymer materials.

It is known that high molecular weight, synthetic polymers of an iso-olefin such as isobutylene, or interpolymers of an iso-olefin such as isobutylene with a diolefin such as butadiene or isoprene or piperylene or dimethyl butadiene can be produced by the use of a low temperature technique, in which the olefin or mixed olefins are cooled to temperatures ranging from —20° C. to —100° or —150° C., or even lower, by the admixture with the olefin or mixed olefins of a diluent-refrigerant such as liquid ethylene or other lower boiling liquid hydrocarbon substances, or by the use of solid carbon dioxide or by suitable external refrigeration of the reactor, in which cases the reactants are preferably admixed with a diluent such as methyl chloride; and applying to the cool mixture a dissolved active halide catalyst, or Friedel-Crafts type catalyst, such as AlCl₃ or AlBr₃ or titanium tetrachloride or the like, dissolved in a low freezing, inert solvent such as ethyl or methyl chloride or carbon bisulfide. The catalyst may be introduced, for example, by spraying it onto the surface of the rapidly stirred olefinic mixture, or by mixing it directly into the body of the agitated liquid. The reaction begins promptly and may reach a desired stage, approaching complete polymerization within a relatively few minutes. The material obtained after interpolymerizing the mixed olefins has a low unsaturation, usually measured by an iodine number ranging from 1 to 40 or 50, and usually has a molecular weight above 15,000, preferably within the range of about 30,000 to about 150,000 or even higher. The interpolymeric material, in spite of its relatively low unsaturation, shows the property of reactivity with sulfur to produce a cured material having an elastic limit, a tensile strength at break ranging from 1,000 to 5,000 pounds per square inch and an elongation at break ranging from 500% to 1200%. However, this amount of unsaturation is also sufficient for the raw polymer to exhibit considerable breakdown in molecular weight during storage, due presumably to the presence of peroxides. As a result of this breakdown in molecular weight, the subsequently cured polymer is of low tensile strength. It has been previously suggested to stabilize such polymers by incorporating a small amount of a stabilizing agent in the finished polymer. This is usually accomplished by milling the finished polymer with the stabilizing material. However, it has been found that during the processing of the polymer prior to milling, particularly during the drying operation, usually carried out at a temperature between 200° and 350° F. breakdown of the polymer occurs, often to such an extent that only an undesirably gummy mass is formed. This breakdown during the drying operation is particularly severe in the case of the simple olefinic polymers, such as the polymer of isobutylene. Furthermore, the milling operation is an extra step and it is difficult to thoroughly incorporate the inhibitor in the polymer.

It has now been found that these difficulties can be overcome and the finishing operation simplified by adding the stabilizing agent to the wash water into which the polymer is introduced. By operating in this manner, the drying step can be carried out without any breakdown occurring and the stabilizer is more readily incorporated in the polymer.

The present invention furthermore provides a new and useful combination of steps for the processing of low temperature polymerizates to produce the solid olefinic polymers or interpolymers in the form of fine grained slurries; to the making of polymer or copolymer slurries in water which are readily handled; and to the improving and preserving of their physical properties during storage, drying and subsequent mechanical working and mastication.

Broadly, the present invention consists of the steps of preparing a reactive mixture of the desired olefinic material at the desired low temperature, as taught in the copending applications of Thomas and Sparks, Serial No. 182,252, now U. S. Patent 2,356,127 and Sparks, Serial No. 300,336, now U. S. Patent 2,356,128; generally it is desirable to use iso-olefins having not more than about 7 carbon atoms, the reaction material being preferably isobutylene, either with or without a diolefin such as butadiene, or isoprene, or 2,3-dimethylbutadiene-1,3; or with piperylene or a non-conjugated diolefin such as 2-methyl hexadiene-1,5; 2,6-dimethyl-hexadiene-1,5; or triolefins such as hexatriene, myrcene, 1,6-dimethyl heptatriene-1,3,5 and 2,4,6-trimethyl-1,3,5-hexatriene or other olefins having a plurality of double bonds; and cooling the mixture by internal or external refrigeration, e. g., by liquid ethylene, to a temperature ranging from —40° C. to —100° C. or as low as —160° C. To this mixture there is then added a Friedel-Crafts type active halide catalyst, which may be boron fluoride or aluminum chloride in solution in an inert low freezing solvent or may be other similar active halide catalyst materials. This polymerization reaction is conducted under conditions to give a finely pulverulent form of polymer or interpolymer particles, which is highly desirable in order to permit the maximum speed of processing the solid polymer in subsequent operations.

When the polymerization reaction has reached the desired stage of completion, it is passed to a flash tank containing warm water which volatilizes out most of the volatile components and, at the same time, deactivates and washes out much of the deactivated catalyst. The polymer is maintained in a form which is easy to pump by the addition to the warm water, prior to or simultaneously with the addition of the polymer thereto, of a suitable dispersing agent.

According to the present invention a stabilizing agent is added to the warm water along with the dispersing agent. A particularly effective method is to prepare a mixture of the stabilizing agent, the dispersing agent, a liquid and an emulsifying or wetting agent and then to add this mixture to the water before or simultaneously with the addition of the polymer.

Referring to the drawing, the polymerization equipment consists of a tube bundle type of reactor 1 such as described in the patent application of Bannon (U. S. Serial No. 448,575, filed June 26, 1942). No internal refrigerant is used, all the heat of reaction being transferred through the reactor walls to an external refrigerant. The liquid refrigerant, suitably ethylene, is introduced into the space between tube sheets 2 and 3 through line 4, while vaporized refrigerant leaves the said space through line 5. Precooled reactant mixture of iso-olefin and diolefin enters the reactor through line 6. The polymerization mixture desirably consists of from about 60 to 99.5 wt. per cent of an iso-olefin having from 4 to 8 carbon atoms per molecule, isobutylene being the preferred material; and from 40 to 0.5 wt. per cent of a diolefin. The diolefin may be butadiene or may be substantially any of the substituted butadienes up to those having from 10 to 12 carbon atoms per molecule. Preferred diolefins are isoprene, piperylene and dimethyl butadiene. Alternatively, the non-conjugated diolefins, such as dimethylallene, or the triolefins, such as myrcene, having up to 10 or 12 carbon atoms per molecule, may also be used. The polymerization mixture contains in addition from 100 parts to 700 or more parts of a diluent such as methyl chloride, ethyl chloride, n-butane, isobutane, carbon disulfide, ethylidene difluoride, etc. However, it is possible to operate without the use of a diluent. The liquid ethylene as external refrigerant cools the mixture to a temperature between −90° C. and −103° C. Catalyst solution is added through line 7 provided with a suitable dispersing nozzle.

The catalyst conveniently consists of a solution of a Friedel-Crafts type catalyst such as aluminum chloride, in solution in a non-complex-forming, low-freezing solvent such as ethyl or methyl chloride or carbon disulfide or other mono- or poly-halide containing up to 3 or 4 carbon atoms per molecule or other non-complex-forming solvent which is liquid at temperatures below about −30° C. The list of useable Friedel-Crafts catalyst is well shown by N. O. Calloway in his article on "The Friedel-Crafts synthesis" in the issue of "Chemical Reviews" published for the American Chemical Society at Baltimore in 1935, being volume XVII, Number 3, the article beginning on page 327, the list being particularly well shown on page 375.

The reactant mixture is thoroughly agitated by impeller type agitator 9, so that a circulation of the reacting mixture is produced up through central tube 10 and down through a plurality of peripheral smaller tubes 11, set between tube sheets 2 and 3. The reaction proceeds promptly to form a slurry of solid polymer particles in the diluent and unreacted olefinic components. In those cases in which no diluent is used the polymer forms as a highly dispersed gel in the cold reactant liquid. When a hydrocarbon, such as n-butane, is used as a diluent, the polymer forms a solution in the hydrocarbon. The rate of catalyst delivery with respect to the rate of delivery of fresh reactants is preferably adjusted to such a relationship that the proportion of solid polymer in the reacted mixture is less than about 30%. The polymerization reaction being exothermic, heat is liberated as the polymer forms, which is removed by the liquid ethylene in the space between sheets 2 and 3. The reactor is maintained essentially full of liquid, a mixture of relatively finely divided polymer and excess unreacted hydrocarbons plus diluent overflowing from the reactor through line 12 in amount corresponding to the material fed to the reactor through lines 6 and 7 at a velocity of between 1 and 3 ft. per second, discharging into tank 13 in a downward direction. Line 12 may be tilted upward as shown to provide an effective liquid seal on the reactor. To prevent water vapor from the flash tank getting back into the line 12 which may not run full, conical hood 41 is provided over this discharge end of piping 12. This hood is of the type described in U. S. patent application Serial No. 502,258, filed September 14, 1943 by Messrs. E. V. Murphree, W. W. Waterman and A. D. Green, now Patent No. 2,395,901 and is for the purpose of preventing access of water vapor to the immediate neighborhood of a cold reactor discharge pipe, thus preventing build-up of ice or icy hydrates in this region. The hood is supplied with a dry flushing gas through line 45. The flushing gas may be an inert gas such as $CO_2$, nitrogen, methane, or more conveniently, a small stream of dry recycle gas from the recovery system. A velocity of flushing gas at the bottom of the conical hood of 10 to 15 ft. per minute has been found sufficient to prevent icing. Flash tank 13 is a relatively large vessel designed to withstand mild pressure surges, of the order of 1–10 lbs./sq. in. having a relatively large vapor space, providing preferably several minutes nominal hold-up of the vapors in the flash tank. The tank is supplied with water or other suitable liquid maintained at a suitable level by means of level control 18 actuating flow control valve 40 which controls the rate of withdrawal of slurry from the flash tank. The water slurry is maintained at a suitably elevated temperature level, for example at 100° to 180° F., by means of steam injected through pipe 16 and is kept well agitated by means of turbine type agitators 15. In order to prevent the polymer from agglomerating and to produce a finely divided slurry and in order to simplify the finishing operation a mixture of a stabilizing agent and a dispersing agent is introduced into the flash tank through line 14, or by addition to line 17, or at any other convenient place.

Materials suitable as stabilizers comprise aromatic amines such as phenyl-beta-naphthylamine, phenyl-alpha-naphthylamine, diphenylamine, tetramethyldiaminodiphenylmethane, ditolylamine, and diorthotolylethylene diamine, aminophenols, such as para-benzyl-aminophenol, sulfur-containing amines such as mercaptobenzothiazole, diethylaminophenyl disulfide and thiourea, phenols, such as hydroquinone, 2,6-ditertiary-butyl-4-methylphenol, 2,4-dimethyl-6-tertiary-butylphenol, 2,4,6-trimethylphenol, 4-methyl-2-normal-butylphenol, etc. However, in stabilizing copolymers of isobutylene with conjugated diolefins, only the 2,4,6-trialkylated phenols and 4-methyl-2-normal butyl phenol are suitable since many of the other phenols accelerate the breakdown of these copolymers. However, all of the above phenols are quite suitable for stabilizing polyisobutylene. The aromatic amines and amino phenols are suitable as stabilizers for all of the above polymers and copolymers.

When the reactor is filled to the overflow level, the addition of further olefinic material through the pipeline 6 and catalyst solution through line 7 causes an overflow of the polymer slurry containing from about 70% of its weight to about 95% of its weight of liquid, unreacted, olefinic material plus diluent into the warm liquid, such as water, in the tank 13. This liquid in the flash tank contains a small amount of a material, i. e. a slurry dispersing agent, which prevents the polymer from agglomerating when introduced into the water and in addition a small amount of stabilizing agent. Suitable dispersing agents comprise finely divided aluminum monostearate, aluminum distearate, aluminum tristearate, zinc stearate, magnesium stearate, calcium stearate and similar salts of palmitic, etc. acids of high molecular weight and surface active agents in general. If the liquid used is water or other material in which the salt is insoluble, the salt is preferably introduced into the water with a wetting agent, such as methyl chloride, ethyl ether, a ketone, or preferably a low molecular weight alcohol, such as isopropyl alcohol. Water soluble soaps, such as sodium sulfonates, water-soluble petroleum sulfonic acids or any of the commercial surface active agents disclosed in Industrial and Engineering Chemistry, January, 1939, p. 66–69; January 1941, p. 16–22 and January 1943, p. 126–130 may also be used. For example, the salt may be made into a thick slurry with alcohol, alcohol and water, or with water containing one of the above wetting agents and this slurry continuously pumped into the large amount of water in tank 13. About 1 to 4% of metallic stearate based on the polymer is used. The amount of salt added to the flash tank water may vary from 0.5 to 6% based on the dry polymer. However, a range 1 to 4% is preferred. The stabilizing agent is added in amounts equal to about 0.1 to 1.5% based on the polymer, 0.2 to 0.5% being preferred.

The polymer and cold liquid falling from the hood is caught by a rapidly moving sheet of water from line 17 and pump 27 discharging through jet 42 and directed at the center of the surface of the water in the flash tank. For this purpose a 1½" x 7" rectangular nozzle may be advantageously used for a water flow of around 400 gallons per minute. To protect the tank from sharp thermal shock in case of failure of the water jet a skirt or baffle 43 is provided, a small amount of steam being admitted behind it through line 44. In this way, provision is made for warming up the polymer and volatilizing the liquids without the cold slurry contacting the walls of the flash tank.

The warm liquid, e. g. water, volatilizes out most of the volatile components and at the same time deactivates and washes out much of the deactivated catalyst. Steam is supplied to the flash tank water at 16, to replace the heat lost due to vaporization of the unreacted materials. The polymer tends to float upon the surface of the water but it is kept from doing this by the agitators 15. In general, the polymer contains less than 1%, usually less than 0.1% of volatile hydrocarbon materials.

The vapors leave the flashing zone through line 39 and are fed to compression, drying, liquefaction, and distillation equipment for recovery and return to the reaction zone. The slurry of polymer in water leaves the flashing zone through line 19 and control valve 40 and passes into stripping vessel 20 wherein a suitable sub-atmospheric pressure is maintained. The purpose of this stripping zone is to complete as far as possible removal of volatile materials from the polymer and from the water. In this way, loss of valuable reactant or diluents is minimized, as are fire and other hazards. In addition to the removal of these volatile materials from the polymer, the stripping operation when combined with properly controlled hot air drying in a through-circulation, tunnel type dryer, makes it possible to achieve essentially complete degassing.

A constant level is held in the stripping zone as well as in the flashing zone. The stripper level actuates control of the rate of flow of slurry from the flashing zone to the stripping zone by control valve 40 and the liquid level in the flashing zone controls the return of water to said flashing zone from the vibrating screen pump by means of control valve 18. In this way a minor upset in flow in any part of the system is less likely to cause improper levels to be held in either of the two zones. It is important to maintain the proper level, since too low a level results in an inordinately heavy and difficultly handled slurry while too high a level increases the volume of liquid being agitated and hence decreases agitation per unit volume to the extent that considerable settling of the polymer to the surface tends to occur. The stripping vessel is, like the flashing vessel, provided with an agitator 38, a steam injector 37, and a vapor outlet 21. The pressure in the stripping zone is maintained at about 2 to 5 lbs./sq. in. abs. by means of a 2-stage steam injector 22, which embodies condensers before and after each ejector stage. The condensate from the low pressure stages is returned to the stripper through leg 23 while the recovered vapors are sent to the flashing zone, through line 24. The slurry leaves the stripper through line 25 with the aid of pump 26 at a rate controlled by flow controller 28 and passes into weir box 29 from which it is distributed over vibrating screen 30. Excess water drains through the vibrating screen into tank 31, the moist polymer discharged from the end of vibrating screen at 34 containing a substantial percentage of water. The moist polymer is supplied to an endless screen passing through a tunnel dryer of the through-circulation type in which hot air is recirculated over steam coils and down through a bed of material on the screen. Fresh air enters at the discharge end of the tunnel and moist air is exhausted to the atmosphere at various points along the dryer. Drying temperatures of up to about 340° F. are utilized and these conditions of good contact of the rapidly moving air stream with finely divided polymer suffice to drive off residual volatile materials which would ordinarily give rise to blister formation during vulcanization if they were not removed. Water draining through vibrating screen 30 into tank 31 is returned to the flash tank 13 by means of pump 35 and flow controller 18 in order to save water, slurry dispersing agents, stabilizing agents and any other valuable materials contained therein.

Tank 31 is provided with fresh water makeup 32 and a water overflow 33 to provide for purging any undesirable accumulations. It will be noted that flow controllers shown in slurry lines utilize a Venturi meter instead of the usual orifice type of meter as the measuring device in order to avoid plugging by the solid polymer particles. The control valves are also of a special streamlined design which are not readily plugged by solid material. In order to take care of any large surges in pressure as may occur if a large slug of polymer or of reaction mixture should strike the water in the tank, a suitable safety valve 50 may be provided on the flash chamber. Modifications of this equipment may also be used, but in all these modifications which involve the use of a flash tank, there is a dispersing agent and a stabilizer added to the liquid in the flash tank.

The following examples illustrate the operation of this invention.

*Example 1*

1400 cc. of isobutylene and 20 cc. of isoprene were diluted with 2800 cc. of methyl chloride. The solution was cooled externally with liquid ethylene and agitated while a catalyst consisting of aluminum chloride dissolved in methyl chloride (0.2 g./100 cc.) was added.

Five grams of zinc stearate were added to the reaction slurry. This slurry was slowly poured into agitated warm water. Three grams of phenyl-beta-naphthylamine were simultaneously added to the water. The amine was added as an alcohol-water dispersion.

*Example 2*

Ten grams of phenyl-beta-naphthylamine were wetted with 91 per cent isopropyl alcohol. Ten grams of zinc stearate were added and sufficient alcohol to make a paste. A total of 34 cc. of alcohol was used. 150 cc. of water were added. A thin paste resulted which showed almost no separation after standing for four days.

1400 cc. of isobutylene, 18.7 cc. of isoprene, and 2800 cc. of methyl chloride were cooled externally with liquid ethylene and agitated while a catalyst consisting of aluminum chloride dissolved in methyl chloride (0.2 g./100 cc.) was added as a spray. A slurry of polymer formed. This slurry was slowly added to agitated hot water to flash off the methyl chloride and unused reactants. While the cold slurry was being added to the hot water, one fourth of the above zinc stearate-phenyl-beta-naphthyl-amine dispersion was added in a portion-wise manner to the water. A good slurry of the polymer in the water was obtained. A sample of the recovered polymer was exposed to direct sunlight for a few hours. It uniformly darkened, which proves that the phenyl-beta-naphthylamine was uniformly picked up by the polymer in the water. (Note: phenyl-beta-naphthylamine darkens rapidly when exposed to sunlight.)

*Example 3*

Ten grams of phenyl-beta-naphthylamine were wetted with 12 cc. of water. Ten grams of zinc stearate were worked into the phenyl-beta-naphthylamine paste. The zinc stearate was added in portions, and more water was added as needed. A total of 67 cc. of water was used to make the dispersion. The zinc stearate was more difficult to work into the paste than in Example 2.

A cold slurry of polymer was prepared as in Example 2. One quarter of the phenyl-beta-naphthylamine-zinc stearate dispersion was added to the agitated hot water as in Example 2 while the cold slurry was being added to the water. A very good aqueous slurry of polymer was obtained. Uniform dispersion of the amine in the polymer was realized, as was evident from the uniform darkening of the product in sunlight.

*Example 4*

Fourteen hundredths gram of Aerosol OT (dioctyl ester of sodium sulfosuccinic acid) wetting agent was dissolved in 80 cc. of water. Sufficient of this solution was added to 10 grams of phenyl-beta-naphthylamine to make a thin paste. The amine wetted immediately. Ten grams of zinc stearate were incorporated portion-wise with the remainder of the wetting agent solution. The zinc stearate worked in very readily and much easier than in Example 3. A thin paste resulted which showed but little change after standing four days.

One quarter of this paste was used in a manner analogous to that in Example 2. A good water slurry of polymer was obtained, and good dispersion of the amine was also obtained, as judged by the darkening test.

*Example 5*

In an experiment similar to those described above, a 4% solution of phenyl-beta-naphthylamine in methyl chloride was added to the agitated hot water while a cold slurry of polymer was added. The amine was picked up by the polymer as shown by the darkening test, although the distribution was not quite as good as in the other cases.

Further experiments were run in which phenyl-beta-naphthylamine or a mixture of this amine and zinc stearate was added as above. The pH of the water as varied from 7.0 to 8.5 with excellent results.

*Example 6*

A slurry of 2,6-di-tertiary-butyl-4-methylphenol was made up by dissolving the stabilizer in isopropyl alcohol, adding zinc stearate, and then diluting the water according to the following recipe:

3 lbs. 2,6-di-tertiary-butyl-4-methylphenol
8.2 liters 91% isopropyl alcohol
6 lbs. zinc stearate
10.9 liters water containing 136 g. Neutronyx #100

At 15 minute intervals a sufficient amount of this slurry was added to the agitated water in the flash tank to give about 0.5% of the phenolic stabilizer based on the rubber.

The overflow from the reactor consisted of a dispersion of a copolymer of isobutylene and isoprene in methyl chloride. This dispersion flowed continuously into the flash tank, whereupon the methyl chloride and unreacted reactants were flashed off as gases. The rubber remained as a slurry in the water. This rubber picked up the zinc stearate which helped to maintain the slurry. The di-tertiary butyl-methyl-phenol was also picked up by the rubber as was evident from the yellow color of the rubber and the following analysis:

Per cent ditertiary butyl p-cresol in the rubber=0.26.

*Example 7*

Two different slurries of phenyl-beta-naphthylamine were prepared, one in which the stabilizer was suspended in water and the other in which it was suspended in water with zinc stearate, and one or the other was added in different runs to the main body of the hot flash tank water at the time the cold polymer slurry was added. In addition, a weak sodium hydroxide solution was added to the water to neutralize the residual catalyst and a range of pH values from 6.0 to 9.3 were obtained. The results, as exemplified by molecular weight as shown in the attached table, indicated that the polymer containing the stabilizer maintained satisfactory stability during normal storage.

*Normal storage data on isobutylene-isoprene copolymer flashed in water of various alkali contents (containing phenyl-beta-naphthylamine)*

| Run No. | Inhibitor [1] Formula Used | Final pH of flash tank water | Percent Conversion of Isobutylene | Molecular Weight | |
|---|---|---|---|---|---|
| | | | | Original | After 20 Months' Normal Storage |
| 1 | Blank | 6.0 | 70 | 57,000 | 46,000 |
| 2 | (2) | 7.2 | 73 | 60,000 | 59,500 |
| 3 | (1) | 7.6 | 44 | 60,000 | 59,500 |
| 4 | (2) | 8.5 | 66 | 61,000 | 61,000 |
| 5 | (1) | 9.3 | 57 | 54,000 | 55,000 |

[1] The inhibitor was incorporated into the polymer by adding it slowly to the hot flash tank water while the cold polymer slurry was being flashed. The amount of inhibitor was approximately 0.5 per cent based on the dry polymer.

Formula (1)=10 g. phenyl-beta-naphthylamine, 17.5 g. water, 10 g. zinc stearate.
Formula (2)=10 g. phenyl-beta-naphthylamine, 30 cc. water.

A 0.038 N NaOH solution was also added to the water during the flashing to neutralize residual catalyst and produce various alkali concentrations.

In the above examples and throughout this specification and the appended claims, wherever the term "olefinic material" is used, it refers to iso-olefins such as isobutylene or to polyolefins such as butadiene, isoprene, piperylene; 2-methyl hexadiene-1,5; myrcene, hexatriene or any other mono-olefin or polyolefin or homolog thereof, capable of polymerizing by itself or of interpolymerization with an iso-olefin.

The nature and objects of the present invention having thus been described and illustrated, what is claimed as new and useful and desired to be secured by Letters Patent is:

1. The process comprising mixing 60 to 99.5 weight percent of isobutylene and 40 to 0.5 percent of a polyolefin having 4 to 10 carbon atoms and an organic diluent which has less than 5 carbon atoms and is liquid at the reaction temperature, cooling the mixture to a temperature within the range between −40° C. and −150° C., and contacting said cold mixture with a solution of a Friedel-Crafts catalyst in a non-complex-forming organic solvent which is liquid when contacted with said mixture, to form a slurry of solid polymer particles in cold reaction liquid, discharging said slurry into heated, well-agitated water to which has been added a dispersion of a water-insoluble metal soap of a fatty acid having from 16 to 18 carbon atoms per molecule and a metal selected from the group consisting of magnesium, zinc, aluminum and calcium in a mixture of water and a wetting agent, and a solid 2,4,6-trialkyl phenol stabilizing agent in suspension in order to flash off the volatile reaction liquid and form a slurry of finely divided polymer particles in water, and separating the polymer particles from said water slurry.

2. The process which comprises polymerizing isobutylene at a temperature between −40° C. and −160° C., in contact with a Friedel-Crafts cataylst dissolved in an organic non-complex forming solvent which is liquid at the reaction temperature to form a polymer, discharging said polymer into heated water containing a water-insoluble soap of a fatty acid having 16 to 18 carbon atoms per molecule and a metal selected from the group, consisting of magnesium, zinc, aluminum and calcium and further containing a suspension of a non-volatile anti-oxidant selected from the group consisting of aromatic amines, aminophenols and 2,4,6-trialkyl phenols in order to flash off the volatile reaction liquid and maintain the polymer in finely divided form, separating the polymer particles from the water, withdrawing the volatilized materials, subjecting the volatilized materials to a recovery treatment and recycling the recovered material to the polymerization.

3. The process which comprises polymerizing isobutylene at a temperature between −40° C. and −160° C., in a diluent which has 1 to 4 carbon atoms per molecule and is liquid at the polymerization temperature, in contact with a Friedel-Crafts catalyst dissolved in an organic non-complex forming solvent which is liquid at the reaction temperature to form a slurry of solid polymer particles in cold reaction liquid, discharging said slurry into heated well-agitated water containing a water-insoluble soap of a fatty acid having from 16 to 18 carbon atoms per molecule and a metal selected from the group consisting of magnesium, zinc, aluminum and calcium and further containing a suspension of a non-volatile antioxidant selected from the group consisting of aromatic amines, aminophenols and 2,4,6-trialkyl phenols in order to flash off the volatile reaction liquid and form a slurry of finely divided polymer particles in water, and separating the polymer particles from said water slurry.

4. A process according to claim 3, wherein the diluent is a hydrocarbon having 1 to 4 carbon atoms per molecule.

5. A process according to claim 3, wherein the diluent is an alkyl halide having less than three carbon atoms per molecule.

6. The process which comprises co-polymerizing isobutylene and a conjugated diolefin having 4 to 10 carbon atoms per molecule at a temperature between −40° and −160° C., with a Friedel-Crafts catalyst dissolved in an organic non-complex forming solvent which is liquid at the reaction temperature to form a solid polymer, discharging the polymer into heated well-agitated water containing a water-insoluble soap of a fatty acid having 16 to 18 carbon atoms per molecule and a metal selected from the group consisting of magnesium, zinc, aluminum and calcium and further containing in suspension a non-volatile anti-oxidant selected from the group consisting of aromatic amines, aminophenols and 2,4,6-trialkyl phenols in order to flash off the volatile reaction liquid and form a slurry of finely divided polymer particles in water, and separating the polymer particles from said water slurry.

7. The process which comprises co-polymerizing one part of a mixture consisting of 60 to 99.5 weight percent of isobutylene and 40 to 0.5 weight percent of a conjugated diolefin having 4 to 6 carbon atoms per molecule in up to 10 parts of a suitable diluent which has 1 to 4 carbon atoms per molecule and is liquid at the reaction temperature by adding thereto a solution of an aluminum halide catalyst in a low freezing non-complex forming solvent, which solution is liquid at the reaction temperature, to form a slurry of solid polymer particles in reaction liquid at a temperature between −40° C. and −160° C., withdrawing the slurry from the reaction zone and discharging it into heated well-agitated water containing a suspension of zinc stearate and of a non-volatile anti-oxidant selected from the group consisting of aromatic amines, aminophenols and 2,4,6-trialkyl phenols in order to flash off the volatile reaction liquids and to form a slurry of finely divided polymer particles in water, and separating the polymer particles from said water slurry.

8. The process which comprises polymerizing one part of a mixture consisting of 60 to 99.5 weight percent of isobutylene and 40 to 0.5 weight percent of isoprene in up to 10 parts of a suitable diluent which has 1 to 4 carbon atoms per molecule and is liquid at the reaction temperature, by adding thereto a solution of Friedel-Crafts catalyst in a low freezing non-complex forming solvent which solution is liquid at the reaction temperature to form a slurry of solid polymer particles in reaction liquid at a temperature between −40° C. and −160° C., withdrawing the slurry from the reaction zone, discharging it into heated well-agitated water containing zinc stearate and 2,6-di-tertiary-butyl-4-methylphenol in suspension in order to flash off the volatile reaction liquids and form a slurry of finely divided polymer particles in water and separating the polymer particles from said water slurry.

9. The process which comprises polymerizing one part of a mixture consisting of 60 to 99.5 weight percent of isobutylene and 40 to 0.5 weight percent of a conjugated butadiene hydrocarbon having 4 to 6 carbon atoms in up to 10 parts of a diluent which has 1 to 4 carbon atoms per molecule and is liquid at the polymerization temperature, by adding thereto a solution of an aluminum halide catalyst in a low-freezing, non-complex forming organic solvent which is liquid at the reaction temperature to form a slurry of solid polymer particles in reaction liquid at a temperature between −40° C. and −160° C., withdrawing the slurry from the reaction zone and discharging it into heated well-agitated water containing zinc stearate and phenyl-beta-naphthylamine in suspension in order to flash off the volatile reaction liquids and form a slurry of finely divided polymer particles in water, and separating the polymer particles from the water slurry.

10. The process which comprises polymerizing one part of a mixture consisting of 60 to 99.5 weight percent isobutylene and 40 to 0.5 weight percent of a conjugated diolefin having 4 to 6 carbon atoms per molecule in up to 10 parts of methyl chloride while maintaining the reaction mixture at a temperature between −40° C. and −160° C., thereby forming a slurry of solid polymer particles in reaction liquid, withdrawing the slurry from the reaction zone and discharging it into heated well-agitated water to which has been added a dispersion formed by dispersing zinc stearate and 2,6-di-tertiary-butyl-4-methylphenol in water with a wetting agent in order to flash off the volatile reaction liquid and form a slurry of finely divided polymer particles in water, and separating the polymer particles from said water slurry.

11. A process according to claim 10, wherein the wetting agent is a low molecular weight alcohol.

12. The process which comprises polymerizing one part of a mixture consisting of 60 to 99.5 weight percent of isobutylene and 40 to 0.5 weight percent of a conjugated diolefin having 4 to 6 carbon atoms per molecule in up to 10 parts of methyl chloride while maintaining the reaction mixture at a temperature between −40° C. and −160° C., thereby forming a slurry of solid polymer particles in reaction liquid, withdrawing the slurry from the reaction zone and discharging it into heated well-agitated water to which has been added a dispersion formed by dispersing zinc stearate and a diaryl amine in water with a wetting agent in order to flash off the volatile reaction liquid and form a slurry of finely divided polymer particles in water and separating the polymer particles from the water slurry.

JOSEPH F. NELSON.

REFERENCES CITED

The following references are of record in the file of this patent:

UNITED STATES PATENTS

| Number | Name | Date |
|--------|------|------|
| 2,356,128 | Thomas | Aug. 22, 1945 |